UNITED STATES PATENT OFFICE.

ARTHUR HEINEMANN, OF LONDON, ENGLAND.

PROCESS OF CONVERTING CARBOHYDRATES INTO HYDROCARBONS.

951,072.　Specification of Letters Patent.　Patented Mar. 1, 1910.

No Drawing.　Application filed September 21, 1909. Serial No. 518,839.

To all whom it may concern:

Be it known that I, ARTHUR HEINEMANN, a subject of the Emperor of Germany, residing at 60 Carlton Mansions, Portsdown Road, Maida Vale, London, W., England, have invented a new and useful Process for Converting Carbohydrates into Hydrocarbons, of which the following is a specification.

This invention relates to the manufacture of compounds of carbon and hydrogen, particularly to compounds of the formula $C_5H_8$ or polymers thereof, generally represented by the formula $(C_5H_8)_n$.

The object of the invention is to obtain from carbohydrates of common occurrence and cheap nature a compound of the formula $C_5H_8$ which can be readily converted into hydrocarbons of a valuable nature, such, for instance, as camphor and essential oils.

Since the carbohydrates of plants are unquestionably closely related to the hydrocarbons formed in plants or through their agency it is reasonable to conclude that the former may be converted into the latter.

Hydrocarbons containing $C_5H_8$ or multiples thereof under certain circumstances are converted into derivatives of the carbohydrates. For instance the hydrocarbon $C_{10}H_{16}$, caoutchouc, when ozonized is converted into lævulinic acid $C_5H_8O_3$ and its aldehyde $C_5H_8O_2$. Geraniol and linalool, $C_{10}H_{18}O$, both olefinic terpene alcohols, give when oxidized besides other substances lævulinic acid.

That bodies containing the group $C_5H_8O_3$ may be derived from sugars and other carbohydrates is well known. It is therefore quite logical to take advantage of this relationship in converting the common carbohydrates into the more valuable hydrocarbons based on the same radical, viz. pentadienyl, $C_5H_8$. For this purpose all carbohydrates and their derivatives may be used, sugar, dextrin, starch, gums and cellulose being the most suitable.

The present invention consists in the manufacture of a hydrocarbon of the form $C_5H_8$ and its polymers $(C_5H_8)_n$ from carbohydrates by first converting the carbohydrates into lævulinic acid and then reducing the latter, as by treating it with certain compounds of sulfur and afterward with hydrogen.

In carrying out the invention the carbohydrate, for example ordinary cane sugar or starch, is first converted by boiling with dilute hydrochloric or sulfuric acid into a compound containing the group $C_5H_8$, namely lævulinic acid, $C_5H_8O_3$. The lævulinic acid of the formula $CH_3—CO—CH_2CH_2—COOH$ so obtained is then mixed with 1½ parts of phosphorus trisulfid. This mixture is heated in a retort to 130–140° C. At this temperature a violent reaction takes place and an oily body of the thiophene group distils over, viz., thiotolene, $C_4H_3—CH_3—S$. The structural formula of this body is

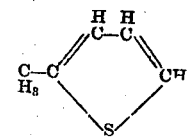

The conversion of the carbohydrate can also be effected by the use of phosphorus pentasulfid, when oxythiotolene, viz. thiotenol, $CH_3—C_4H_2—S—OH$, will first be produced, the structural formula of which is

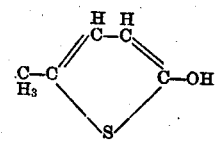

The thiotenol so obtained is then either reduced to thiotolene by means of phosphorus trisulfid or alternatively the thiotenol may be directly treated with hydrogen as hereinafter described.

In the case of the production of thiotenol 3 parts of lævulinic acid is mixed with 2 parts of phosphorus pentasulfid and treated in the same way as hereinbefore described.

Instead of using compounds of sulfur and phosphorus other compounds of sulfur, for instance those with potassium, sodium, calcium, arsenic, etc. may be employed. Likewise sulfur alone, or such compounds as sulfureted hydrogen, ammonium hydrosulfid, sulfur dioxid and the like may be used.

The thiotolene (or thiotenol) obtained is then reduced, either by means of hydrogen alone or by reducting mixtures such as water-gas, in the following manner. The thiotolene together with hydrogen is passed through a tube or vessel heated to 500°–700° C. and containing finely divided copper, nickel, iron, silver or the like. As a result of the action of hydrogen and heat the ring indicated by the formula

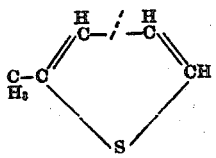

is broken at the line marked ,', the sulfur liberated combining with the metal; for instance in the case of copper, copper sulfid is formed. The excess of hydrogen present combines with the free valencies of the carbon acts both on the copper sulfid, reducing it again to metallic copper, and on the thiotolene, the sulfur contained in the latter being removed. The final product is $C_5H_8$, a methylbutin, a hemiterpene, the structural formula of which is of the general type

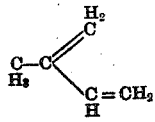

A temperature of more than 700° C., produces polymeric compounds.

Instead of using ordinary hydrogen as above described nascent hydrogen prepared in any suitable manner may be used.

Having described my invention what I claim and desire to secure by Letters Patent is:—

The process of converting carbohydrates into hydrocarbons of the formula $C_5H_8$ or multiples thereof which consists in first converting a carbohydrate into lævulinic acid, then producing a compound of the thiophene group from the lævulinic acid by treating the same with a body containing sulfur, and finally converting the thiophene compound into a hydrocarbon of the above-named composition by reduction with hydrogen in a heated tube or vessel containing finely divided metal, substantially as described herein.

In testimony whereof I have signed my name to this specification in the presence of two subscribing witnesses.

ARTHUR HEINEMANN.

Witnesses:
ARTHUR F. ENNIS,
F. L. RAND.